June 29, 1971 W. OSTBERG ET AL 3,589,920
PROCESS FOR MANUFACTURING LOW ALKALI CEMENTS
Filed Nov. 17, 1969          2 Sheets-Sheet 1

INVENTORS
WERNER OSTBERG.
TERRY PATZIAS.
BY CULLEN, SETTLE, SLOMAN & CANTOR.
ATT'YS

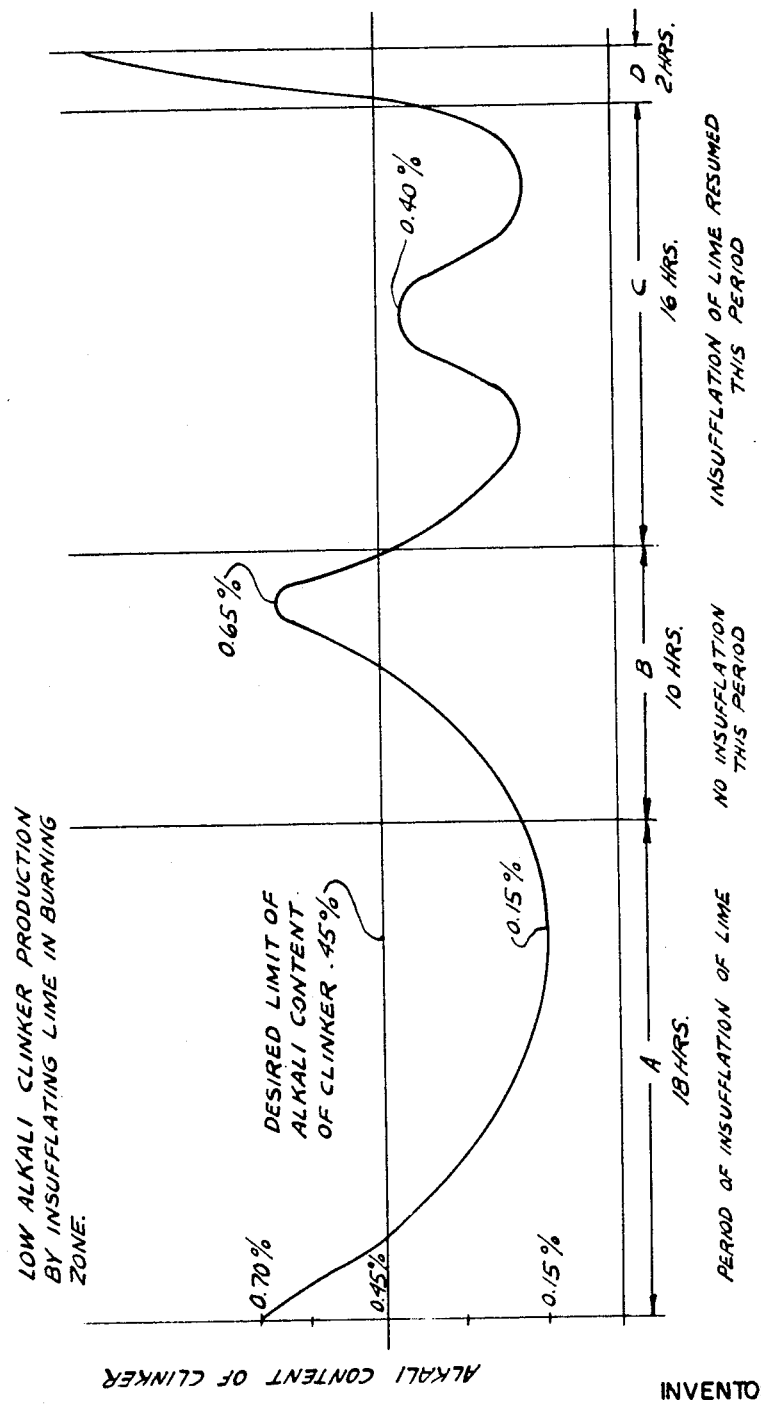

United States Patent Office 3,589,920
Patented June 29, 1971

3,589,920
PROCESS FOR MANUFACTURING LOW
ALKALI CEMENTS
Werner Ostberg and Terry Patzias, Ann Arbor, Mich.,
assignors to Dundee Cement Company, Dundee, Mich.
Continuation-in-part of abandoned application Ser. No.
648,238, June 23, 1967. This application Nov. 17, 1969,
Ser. No. 877,244
The portion of the term of the patent subsequent to
Apr. 8, 1986, has been disclaimed
Int. Cl. C04b 7/02, 7/42
U.S. Cl. 106—100                                 3 Claims

ABSTRACT OF THE DISCLOSURE

This application relates to producing low alkali portland cements by adding dry, pulverized lime to the burning zone of the cement clinker forming kiln, to react with the cement raw materials and thereby convert the alkali contents thereof into non-corrosive, alkali vapors, which are removed as a gas, thereby reducing the alkali content of the cement clinker.

---

This is a continuation-in-part of co-pending application Ser. No. 648,238, filed June 23, 1967 now abandoned.

BACKGROUND OF THE INVENTION

Portland cement is conventionally manufactured by a continuous process which generally comprises introducing into a rotary cement kiln, a mixture of calcareous and argillaceous materials, which react in the kiln to form cement clinker, which is continuously removed and ultimately mixed and ground with gypsum to form powdered cement. The raw materials used in this process include a small quantity of alkali minerals, in the form of sodium and potassium compounds, which are incorporated, as an impurity, in the clinker and in the finished cement.

For ordinary and general purposes, the presence of the small amount of alkalies in the cement is not significant and therefore, it is generally ignored. However, where the cement is used for certain specific purposes, the alkali content has a deleterious effect upon the concrete made from the cement and therefore becomes significant. Hence, for certain purposes it is necessary to reduce the alkali content to form what is commonly called "low alkali cement," which is normally specified as being cement having a total alkali content which does not exceed 0.60%, computed as $Na_2O$.

Although the use of such low alkali cement is not generally common, it is frequently specified in concrete constructions where the aggregates contain some siliceous constituents in a reactive form of silca. In those instances, where there is both a relatively high content of alkali in the cement, and the presence of particularly reactive constituents in the aggregates, a reaction known as "alkali-aggregate reaction" takes place, leading to the formation of an alkali-silicate gel from the alkalies released from the cement and the reactive silica of the aggregate. This gel appears to have a great affinity for water and great osmotic pressures, sufficient to cause excessive expansion and cracking of the concrete, accompanied by loss of strength, elasticity and durability.

Therefore, to avoid such problems in those instances where they may occur, as mentioned above, "low alkali cements" are specified, these normally being considered as cement having a total alkali content, referred to as "equivalent $Na_2O$" (actually $Na_2+0.658K_2O$) of less than 0.60 percent.

In the past, to produce such low alkali cement, it has been conventional to add calcium chloride or calcium fluoride to the raw material mixture. Such calcium chloride or fluoride reacts, in the kiln, with the alkalies to form a volatile alkali chloride or fluoride which is removed as a gas. Although this process is satisfactory to produce low alkali cements, reducing the alkalies in the cement to below the specified maximum, the alkali chloride or fluorides so formed are corrosive and thereby have a deleterious effect upon the kiln and particularly upon the dust removal systems connected with the kiln. It has also been known to add halogens at the burning zone to form low alkali cement, but this practice not only caused the formation of corrosive gases, but it also impaired the normal desirable internal crust of the kiln.

Hence, there has long been a need for a process for manufacturing low alkali cements satisfactorily, but at the same time eliminating the attendant corrosion problems resulting from volatilizing the alkalies by the addition of calcium chloride or fluoride.

SUMMARY OF THE INVENTION

Thus, it is an object of this invention to provide a process for manufacturing low alkali cements, utilizing the conventional cement manufacturing process by volatilizing and driving off as a gas, alkalies above the prescribed maximum, but wherein the alkali gases formed in the kiln are non-corrosive.

This invention contemplates introducing a predetermined amount of dry, pulverized lime (calcium oxide) into the burning zone of the kiln used in the conventional cement manufacture process to thereby produce low alkali content cement clinker, by reacting the lime with dicalcium silicate forming tricalcium silicate, which process is exothermic, creating favorable conditions for evaporating the alkalies in a non-corrosive vapor form, thereby avoiding corrosion damage to the equipment.

These and other objects and advantages of this invention will become apparent, upon reading the following more detailed description and from the drawing, in which:

FIG. 2 is a graph of results obtained.

DETAILED DISCLOSURE

Figure 1:
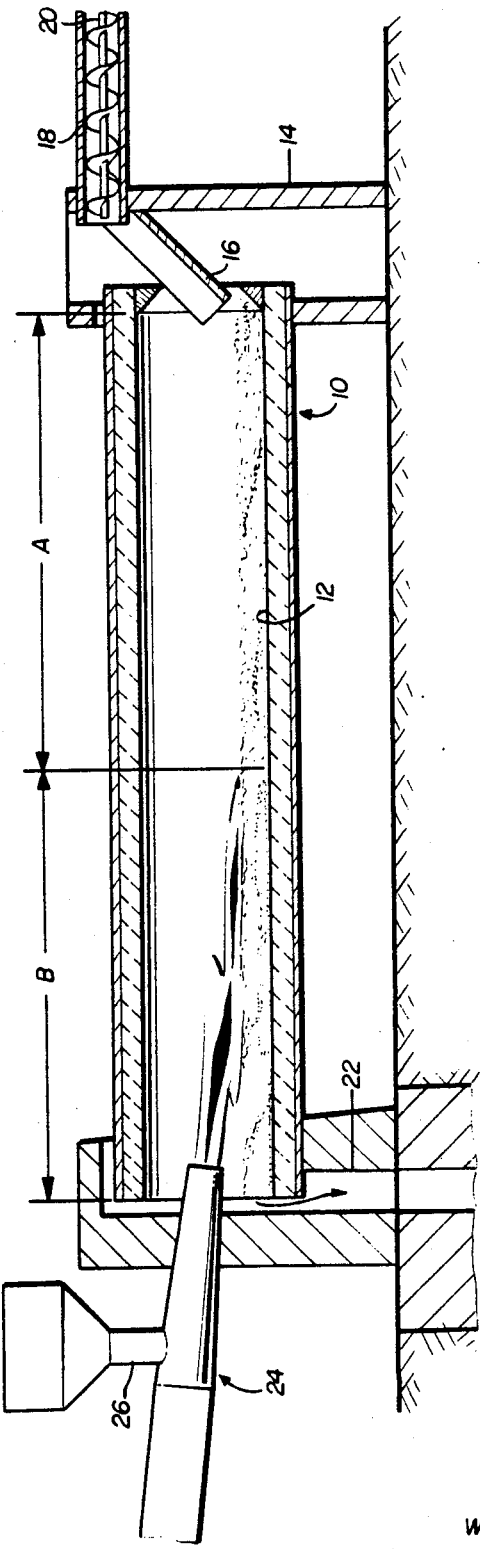
FIG. 1 is a somewhat schematic cross-sectional side view of apparatus used in carrying out the method of the invention.

In the conventional manufacture of portland cement, a mixture of calcareous and argillaceous materials are continuously fed into one end of a heated kiln wherein the materials are reacted to form cement clinker which is continuously removed from the kiln at its other end. The clinker is ground with gypsum to form the finished cement.

The calcareous materials usually comprise limestone, marl, chalk, oyster shells or the like. The argillaceous materials usually comprise clay, shale, slate, slag, fly-ash or the like. Upon reaction in the kiln, these materials form a clinker which, for illustration purposes comprises the following chemical composition.

Chemical composition

| | Percent |
|---|---|
| SiO₂ | 22.0 |
| Al₂O₃ | 5.4 |
| Fe₂O₃ | 2.5 |
| CaO | 65.5 |
| MgO | 2.8 |
| SO₃ | 0.7 |
| Alkalies as Na₂O | 0.8 |
| Ignition loss | 0.1 |
| | 100 |

Mineralogical potential compound composition

| | Percent |
|---|---|
| C₃S | 58.0 |
| C₂S | 20.0 |
| C₃A | 10.0 |
| C₄AF | 7.6 |
| Lime saturation | 93.4 | where, $C = CaO$; $S = SiO_2$; $A = Al_2O_3$; $F = Fe_2O_3$.

The above represents a typical General Purpose Clinker which is then mixed and pulverized with gypsum to make a so-called Type 1, General Purpose Cement.

Such cement may include as an impurity, which is contained in the basic raw materials, alkalies in the form of sodium or potassium oxide, normally computed as sodium oxide, in an amount of more or less 1% by weight.

There are also various types of special purpose cements which vary from the above illustration in percentages of ingredients and which are used for various special purposes. However, all generally include the alkali impurity.

The raw material mixture, whether dry or in slurry form, is normally burned in a kiln having a burning zone with a temperature of approximately 2600 degrees to 2700 degrees F. The heat is provided by burning either pulverized coal or oil or gas, which is introduced in the proper air mixture near the discharge end of a kiln to cause a flame to extend part way through the kiln. The chemical reaction in the flame or burning zone between the lime and the silica, the alumina and the iron oxide forms the clinker.

Various methods of making general and special purpose cements are described in U.S. Pats. 3,437,329; 2,871,113; 1,916,716 and 864,068. Methods of making cement are also described in British Pats. 28,970 and 1,438, and in the following articles: Carlsen—"Rock Products," 61, No. 5, 87–8 (1966) and McLarmour et al., "Rock Products," page 59, July 1943.

The process herein contemplates adding directly to the flame or burning or heating zone of the kiln, calcium oxide, preferably in the form of dry, pulverized lime is predetermined quantities which may be blown into the kiln along with the fuel mixture or blown through a separate entrance into the flame zone.

Conventional apparatus used in carrying out the method of the invention is shown in FIG. 1. The apparatus comprises an inclined kiln 10 provided with a fire resistant lining 12, usually fire brick. The kiln 10 is agitated or revolved by suitable means (not shown) about its longitudinal axis during the process of the cement making. The kiln can conveniently be divided into an input zone A and an outlet flue 14. Raw cement material is delivered to the rear end of the kiln 10 through a chute 16, which is in turn connected to a supply pipe 18 containing a worm screw 20 for moving the raw cement material. The clinker formed during the transit of the raw material through the kiln 10 from the input zone A through the burning zone B is removed from the forward or discharge end of the kiln through a chute 22 into which the kiln 10 empties.

A blast burner 24 projects into the forward end of the kiln 10. The burner 24 inclines downwardly so that the flame is projected directly against the forming cement clinker contained in the bottom of the kiln 10 within the burning zone B.

A feeder 26 opens into the burner 18 at a suitable distance to the rear of the discharge end thereof. Dry pulverized lime is fed through the feeder to the burning zone of the kiln 10, in accordance with the invention. Alternatively, it could be blown in through a separate inlet (not shown) into the burning zone.

The amount of lime added must be sufficient to reduce the alkali content to below the required maximum, while at the same time utilizing substantially all of the available acidic constituents of the raw mixture to react in the kiln, preferably leaving no free lime which has not reacted.

The amount of lime so utilized in reaction, which may be referred to as the "lime saturation," may be calculated by using the following formula:

Lime saturation $$= \frac{\text{percent CaO} \times 100}{\text{percent SiO}_2 \times 2.8 + \text{percent Al}_2\text{O}_3 \times 1.18 + \text{percent Fe}_2\text{O}_3 \times 0.65} = 100$$

Applying this formula to the clinker previously described, the lime saturation equals 93.4%, thus short 6.6% for complete saturation. Hence, it is feasible to introduce additional lime for the purpose of alkali evaporation without, at the same time, exceeding the point of 100% saturation.

By addition of approximately 1% lime, by weight compared with the raw mixture feed, into the burning zone of the kiln, the clinker composition is changed to the following, which represents, as illustrative, a "low alkali" clinker:

| | Percent |
|---|---|
| SiO₂ | 21.6 |
| Al₂O₃ | 5.5 |
| Fe₂O₃ | 2.5 |
| CaO | 67.0 |
| MgO | 2.8 |
| SO₃ | 0.1 |
| Alkalies | 0.4 |
| Ignition loss | 0.1 |
| | 100 |
| C₃S | 68.2 |
| C₂S | 10.6 |
| C₃A | 10.3 |
| C₄AF | 7.6 |
| Lime saturation | 97.68 |

The calcium oxide reacts with the silicates of calcium to form tri-calcium silicate (3CaO·SiO₂), which forms the most part of the normal components making up cement clinker. Since this reaction is exothermic, it produces sufficient heat to permit volatilization of the alkalies to a higher degree than the normal fuel input to the kiln would do at the normal temperature range. It is only at that temperature of the burning zone and at this condition of complete calcination, that the formation of tri-calcium silicate occurs from the existing di-calcium silicate and the additional calcium oxide blown into the burning zone. At the high temperature of the burning zone, the alkalies present in the raw materials will volatilize. This seems to be the basis for their removal from the clinker.

It has been known in the prior art to add lime to the starting end of the kiln, but neither the purpose of adding lime nor the result obtained is the same as in the instant invention where the lime is added in the burning zone.

The process of this invention may be utilized continuously, that is, as a continuous low alkali producing cement process for producing at all time, low alkali clinker, either of the general purpose or special type cement clinker. On the other hand, it may also be utilized as an intermittent type of process, that is, interrupting a conventional cement process for a predetermined time, to produce during that predetermined time, low alkali clinker which is separated from the normal clinker and processed to form low alkali cement by the usual addition of gypsum.

The second, intermittent, operation is the more likely one to be used, since the demand for low alkali cements is relatively low, and thereby it is more likely from an economy point of view to utilize a conventional cement manufacturing process to produce quantities of low alkali cement as needed.

The invention will be more completely understood by reference to the following example:

EXAMPLE

An actual performance run for the preparation of a low alkali clinker was conducted utilizing a conventional cement kiln such as is shown in FIG. 1. The results are shown in the graph, FIG. 2.

At the beginning of the test run, which was continuous, normal portland cement was being manufactured. Dry pulverized lime was then insufflated into the burning zone for a period of 18 hours at the rate of 1.2 tons of lime per 60 tons of clinker produced. As seen from the graph, the alkali content of the clinker dropped from about 0.70% to 0.15%. At the end of the 18 hour period, insufflation was stopped for 10 hours. During that time, the alkali content rose to 0.65%. Insufflation was then resumed and continued for 16 hours. The alkali content then fell below the 0.45% desired maximum alkali content for low alkali cement. Insufflation was then stopped again and the alkali content rose rapidly.

The time lag which occurred between the beginning of lime insufflation and the drop in alkali content of the clinker was due to the fact that the process was continuous and some clinker which was already in the burning zone and about to leave the kiln did not receive the full benefit of the treatment. A similar lag occurred between the time insufflation was stopped and the alkali content reached its maximum.

The efficacy of the method of the invention is thus demonstrated.

Having fully described an operative embodiment of this invention, we now claim:

1. In a portland cement type process for continuously producing cement clinker, wherein high alkali clinker is normally and continuously formed in a long rotary internally crusted kiln, with the raw materials being introduced at the starting end of the kiln, and the finished clinker being discharged at the discharge end of the kiln;

and wherein apparatus causes a burning in the kiln to take place in a burning zone near such discharge end; the improvement which comprises insufflation into the then rotating kiln, whenever it is desired to form low alkali clinker, an adequate quantity of dry pulverized lime, sufficient to form low alkali clinker during such insufflation of lime and in an amount which reaches lime saturation, leaving no free lime which has not reacted;

such insufflation of lime being effected in the burning zone and the discharge end;

such formation of low alkali clinker taking place without such insufflation forming undesirable gases, or destroying the kiln crust;

all the while clinker is being formed continuously in the kiln without interruption of the clinker forming process, and without discontinuing the rotation of the kiln, or the introduction of starting materials or discharge from the kiln;

whereby alternate batches of low alkali clinker as well as high alkali clinker will be discharged;

and all without such insufflation causing formation of undesrable gases in the burning zone or impairing the kiln crust.

2. A process for producing low alkali cement utilizing the conventional, continuous cement forming process, including continuously reacting an alkali containing mixture of calcareous and argillaceous materials in a cement clinker forming kiln having a heating zone to continuously form such cement clinker, comprising:

continuously adding a predetermined quantity of dry, pulverized lime in an amount which reaches lime saturation and leaves no free lime which has not reacted, directly into said heating zone to react with the dicalcium silicates of said materials and thereby form tricalcium silicate, which forms a part of the clinker, and gaseous, non-corrosive alkali vapors;

continuously removing the gaseous alkali sulfates, thereby reducing the alkali content of the clinker.

3. A process as defined in claim 2, and including introducing said lime during predetermined times so as to produce low alkali clinker during those times while otherwise producing conventional cement clinker.

References Cited

UNITED STATES PATENTS

| | | | |
|---|---|---|---|
| 3,437,329 | 4/1969 | Ostberg et al. | 263—53 |
| 2,871,133 | 1/1959 | Palonen et al. | 106—100 |
| 1,916,716 | 7/1933 | Dahl et al. | 106—100 |
| 864,068 | 8/1907 | Bjerregard | 263—53 |

TOBIAS E. LEVOW, Primary Examiner

W. T. SCOTT, Assistant Examiner

U.S. Cl. X.R.

263—53; 106—89